US011003673B2

(12) United States Patent
Challa et al.

(10) Patent No.: US 11,003,673 B2
(45) Date of Patent: May 11, 2021

(54) DYNAMIC LEVEL GROUP CREATION

(71) Applicant: MICROSOFT TECHNOLOGY LICENSING, LLC, Redmond, WA (US)

(72) Inventors: Anupama Padmavathi Challa, Redmond, WA (US); Irum Godil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 16/124,150

(22) Filed: Sep. 6, 2018

(65) Prior Publication Data
US 2020/0081989 A1 Mar. 12, 2020

(51) Int. Cl.
*G06F 16/2457* (2019.01)
*G06F 16/248* (2019.01)
*G06F 16/951* (2019.01)
*G06F 16/35* (2019.01)
*G06Q 50/00* (2012.01)
*G06Q 10/06* (2012.01)

(52) U.S. Cl.
CPC ...... *G06F 16/24578* (2019.01); *G06F 16/248* (2019.01); *G06F 16/951* (2019.01); *G06F 16/35* (2019.01); *G06Q 10/063112* (2013.01); *G06Q 50/01* (2013.01)

(58) Field of Classification Search
CPC ........... A63F 13/795; A63F 2300/5566; G06Q 10/06; G06Q 10/0639; G06Q 10/10; G06Q 10/06311; G06Q 10/063112; G06Q 10/103; G06Q 50/01; G06F 16/285; G06F 16/9535; G06F 16/24578; G06F 16/248; G06F 16/951; G06F 16/35

USPC ........................................................ 705/7.14
See application file for complete search history.

(56) References Cited

U.S. PATENT DOCUMENTS

| 6,907,422 | B1 | 6/2005 | Predovic |
| 7,167,910 | B2 | 1/2007 | Farnham et al. |
| 9,076,156 | B2 | 7/2015 | Newnham et al. |

(Continued)

OTHER PUBLICATIONS

Donjerkovic, et al., "Dynamic Histograms: Capturing Evolving Data Sets", In Proceedings of 16th International Conference on Data Engineering, Feb. 29, 2000, pp. 1-20.

(Continued)

*Primary Examiner* — Dennis Truong
(74) *Attorney, Agent, or Firm* — NovoTechIP International PLLC

(57) ABSTRACT

In data processing device incorporating a processor and memory in communication with the processor, the memory includes executable instructions that, when executed by the processor, cause the data processing device to perform: receiving an attribute metric of a first node with respect to a plurality of second nodes; generating, based on the received attribute metric, a pool of the second nodes that have been in a relationship with the first node; ranking, based on the received attribute metric, the second nodes in the generated pool; dynamically grouping the second nodes to sequentially create one or more level groups; and displaying, on a display, the level groups in a visually differentiated manner reflecting a relative attribute metric of each level group. The device thus presents a display of level groups that is neither cluttered nor sparse.

20 Claims, 11 Drawing Sheets

(56) References Cited

U.S. PATENT DOCUMENTS

| | | | | |
|---|---|---|---|---|
| 2005/0086189 | A1* | 4/2005 | Noble | G06Q 10/10 706/50 |
| 2007/0198317 | A1* | 8/2007 | Harthcryde | G06Q 10/00 705/7.14 |
| 2007/0288283 | A1* | 12/2007 | Fitzpatrick | G06Q 10/063118 705/7.17 |
| 2008/0222170 | A1 | 9/2008 | Farnham et al. | |
| 2013/0080530 | A1* | 3/2013 | Frees | G06Q 10/109 709/204 |
| 2013/0343207 | A1 | 12/2013 | Cook et al. | |
| 2014/0053110 | A1* | 2/2014 | Brown | G06Q 10/06 715/853 |
| 2014/0282355 | A1* | 9/2014 | Berry | G06F 8/70 717/101 |
| 2014/0358880 | A1* | 12/2014 | Li | G06F 16/2455 707/706 |
| 2015/0025928 | A1* | 1/2015 | Kang | G06Q 10/063112 705/7.14 |
| 2015/0066554 | A1* | 3/2015 | Red | G06Q 10/063112 705/7.14 |
| 2015/0066971 | A1* | 3/2015 | Agarwal | H04L 67/306 707/758 |
| 2015/0227611 | A1* | 8/2015 | Bao | G06F 17/11 707/737 |
| 2015/0278718 | A1* | 10/2015 | Evans | G06Q 30/016 705/7.11 |
| 2015/0379131 | A1* | 12/2015 | Gurevich | G06F 16/24578 707/723 |
| 2016/0034841 | A1* | 2/2016 | Matula | G06Q 10/063112 705/7.14 |
| 2016/0203433 | A1* | 7/2016 | Chen | G06Q 10/063112 705/7.14 |
| 2016/0371361 | A1* | 12/2016 | Chino | G06Q 30/0242 |
| 2017/0169391 | A1* | 6/2017 | Mo | G06F 16/176 |
| 2017/0236081 | A1* | 8/2017 | Grady Smith | G06Q 10/067 705/7.36 |
| 2018/0060785 | A1* | 3/2018 | Carnevale | G06Q 10/063112 |
| 2018/0130019 | A1* | 5/2018 | Kolb | G06Q 10/10 |
| 2018/0221749 | A1* | 8/2018 | Le | G06Q 10/06 |
| 2018/0268072 | A1* | 9/2018 | Rathod | G06F 16/9535 |
| 2019/0057338 | A1* | 2/2019 | Botea | G06Q 10/1053 |
| 2019/0259115 | A1* | 8/2019 | McGowan | G06Q 10/103 |

OTHER PUBLICATIONS

Scott Vitter, Jeffrey, "External Memory Algorithms and Data Structures Dealing with Massive Data", In Journal of ACM Computing Surveys, vol. 33, Issue 2, Jun. 2001, pp. 209-271.

* cited by examiner

200

210 — RECEIVING A COLLABORATION METRIC OF A FIRST COLLABORATION NODE WITH RESPECT TO A PLURALITY OF SECOND COLLABORATION NODES IN COMMUNICATION WITH THE FIRST COLLABORATION NODE VIA A COMMUNICATION NETWORK

220 — GENERATING, BASED ON THE RECEIVED COLLABORATION METRIC, A POOL OF THE SECOND COLLABORATION NODES THAT HAVE BEEN IN COLLABORATION WITH THE FIRST COLLABORATION NODE

230 — RANKING, BASED ON THE RECEIVED COLLABORATION METRIC, THE SECOND COLLABORATION NODES IN THE GENERATED POOL

240 — DYNAMICALLY GROUPING THE SECOND COLLABORATION NODES TO SEQUENTIALLY CREATE ONE OR MORE COLLABORATION LEVEL GROUPS

250 — DISPLAYING, ON A DISPLAY, THE COLLABORATION LEVEL GROUPS IN A VISUALLY DIFFERENTIATED MANNER REFLECTING A RELATIVE COLLABORATION METRIC OF EACH COLLABORATION LEVEL GROUP

| NODE | C | E | P | M |
|---|---|---|---|---|
| N1 | C1 | E1 | P1 | M1 |
| N2 | C2 | E2 | P2 | M2 |
| N3 | C3 | E3 | P3 | M3 |
| N4 | C4 | E4 | P4 | M4 |
| N5 | C5 | E5 | P5 | M5 |
| N6 | C6 | E6 | P6 | M6 |
| N7 | C7 | E7 | P7 | M7 |
| N8 | C8 | E8 | P8 | M8 |
| N9 | C9 | E9 | P9 | M9 |
| N10 | C10 | E10 | P10 | M10 |
| N11 | C11 | E11 | P11 | M11 |
| N12 | C12 | E12 | P12 | M12 |
| N13 | C13 | E13 | P13 | M13 |
| N14 | C14 | E14 | P14 | M14 |
| N15 | C15 | E15 | P15 | M15 |

| NODE | C | E | P | M |
|---|---|---|---|---|
| N16 | C16 | E16 | P16 | M16 |
| N17 | C17 | E17 | P17 | M17 |
| N18 | C18 | E18 | P18 | M18 |
| N19 | C19 | E19 | P19 | M19 |
| N20 | C20 | E20 | P20 | M20 |
| N21 | C21 | E21 | P21 | M21 |
| N22 | C22 | E22 | P22 | M22 |
| N23 | C23 | E23 | P23 | M23 |
| N24 | C24 | E24 | P24 | M24 |
| N25 | C25 | E25 | P25 | M25 |
| M26 | C26 | E26 | P26 | M26 |
| N27 | C27 | E27 | P27 | M27 |
| N28 | C28 | E28 | P28 | M28 |
| N29 | C29 | E29 | P29 | M29 |
| N30 | C30 | E30 | P30 | M30 |

| N1 | N2 | N3 | N4 | N5 | N6 | N7 | N8 | N9 | N10 | N11 | N12 | N13 | N14 | N15 | N16 | N17 | N18 | N19 | N20 | N21 | N22 | N23 | N24 | N25 |
|----|----|----|----|----|----|----|----|----|-----|-----|-----|-----|-----|-----|-----|-----|-----|-----|-----|-----|-----|-----|-----|-----|
| C1 | C2 | C3 | C4 | C5 | C6 | C7 | C8 | C9 | C10 | C11 | C12 | C13 | C14 | C15 | C16 | C17 | C18 | C19 | C20 | C21 | C22 | C23 | C24 | C25 |

FIG. 5B (500B)

| X1 | X2 | X3 | X4 | X5 | X6 | X7 | X8 | X9 | X10 | X11 | X12 | X13 | X14 | X15 | X16 | X17 | X18 | X19 | X20 | X21 | X22 | X23 | X24 | X25 |
|----|----|----|----|----|----|----|----|----|-----|-----|-----|-----|-----|-----|-----|-----|-----|-----|-----|-----|-----|-----|-----|-----|
| N12 | N20 | N16 | N5 | N11 | N14 | N1 | N23 | N2 | N10 | N25 | N22 | N17 | N9 | N3 | N8 | N13 | N19 | N24 | N4 | N15 | N18 | N7 | N6 | N21 |
| C12 | C20 | C16 | C5 | C11 | C14 | C1 | C23 | C2 | C10 | C25 | C22 | C17 | C9 | C3 | C8 | C13 | C19 | C24 | C4 | C15 | C18 | C7 | C6 | C21 |

DYNAMIC LEVEL GROUP CREATION

BACKGROUND

Many organizations rely heavily on IT systems to create and operate a networked environment, which allows the members to carry out day-to-day tasks and achieve goals. To understand and analyze collaboration among members of a networked organization, a collaboration map may be created. For example, a server may track email messages exchanged among the members to track collaboration within a team or project and generate collaboration data. Such collaboration data may be used to create a collaboration map showing all the members in the team or project and collaboration status or development among the members. However, when there are a large number of members in a team or project, the collaboration map may be cluttered with too much information when presented on a display, and it may be difficult to find and understand collaborations among particular members. On the other hand, when the collaboration among the members is uneven, the collaboration map may be too sparse with almost no information to display in some area of the display. Hence, there still remain significant areas for new and improved systems for more effectively presenting collaboration data.

SUMMARY

A data processing device is disclosed, which includes a processor and memory in communication with the processor. The memory includes executable instructions that, when executed by the processor, cause the data processing device to perform functions of receiving an attribute metric of a first node with respect to a plurality of second nodes in communication with the first node via a communication network; generating, based on the received attribute metric, a pool of the second nodes that have been in a relationship with the first node; ranking, based on the received attribute metric, the second nodes in the generated pool; dynamically grouping the second nodes to sequentially create one or more level groups, each level group including one or more of the second nodes selected according to a predetermined requirement including the rankings of the second nodes and a level group condition; and displaying, on a display, the level groups in a visually differentiated manner reflecting a relative attribute metric of each level group.

In another implementation, a method is disclosed, which includes receiving an attribute metric of a first node with respect to a plurality of second nodes in communication with the first node via a communication network; generating, based on the received attribute metric, a pool of the second nodes that have been in a relationship with the first node; ranking, based on the received attribute metric, the second nodes in the generated pool; dynamically grouping the second nodes to sequentially create one or more level groups, each level group including one or more of the second nodes selected according to a predetermined requirement including the rankings of the second nodes and a level group condition; and displaying, on a display, the level groups in a visually differentiated manner reflecting a relative attribute metric of each level group.

In another implementation, a data processing device is disclosed, which includes means for receiving an attribute metric of a first node with respect to a plurality of second nodes in a relationship with the first node via a communication network; means for generating, based on the received attribute metric, a pool of the second nodes that have been in a relationship with the first node; means for ranking, based on the received attribute metric, the second nodes in the generated pool; means for dynamically grouping the second nodes to sequentially create one or more level groups, each level group including one or more of the second nodes selected according to a predetermined requirement including the rankings of the second nodes and a level group condition; and means for displaying the level groups in a visually differentiated manner reflecting a relative attribute metric of each level group.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 is a flowchart for an example process for processing collaboration metric to create a collaboration map.

FIG. 4 illustrates an example collaboration metric of a first collaboration node with respect to a plurality of second collaboration nodes.

FIG. 5A illustrates an example pool of the second collaboration nodes generated based on the collaboration metric of FIG. 4.

FIG. 5B illustrates the second collaboration nodes of the pool that are ranked and rearranged based on the collaboration metric.

FIGS. 6A, 6B and 6C illustrate an example of dynamically creating a first collaboration level group with the second collaboration nodes selected from the pool of FIG. 5B.

FIGS. 8A and 8B illustrate an example of dynamically creating a third collaboration level group with the collaboration nodes selected from the pool.

DETAILED DESCRIPTION

Figure 1:
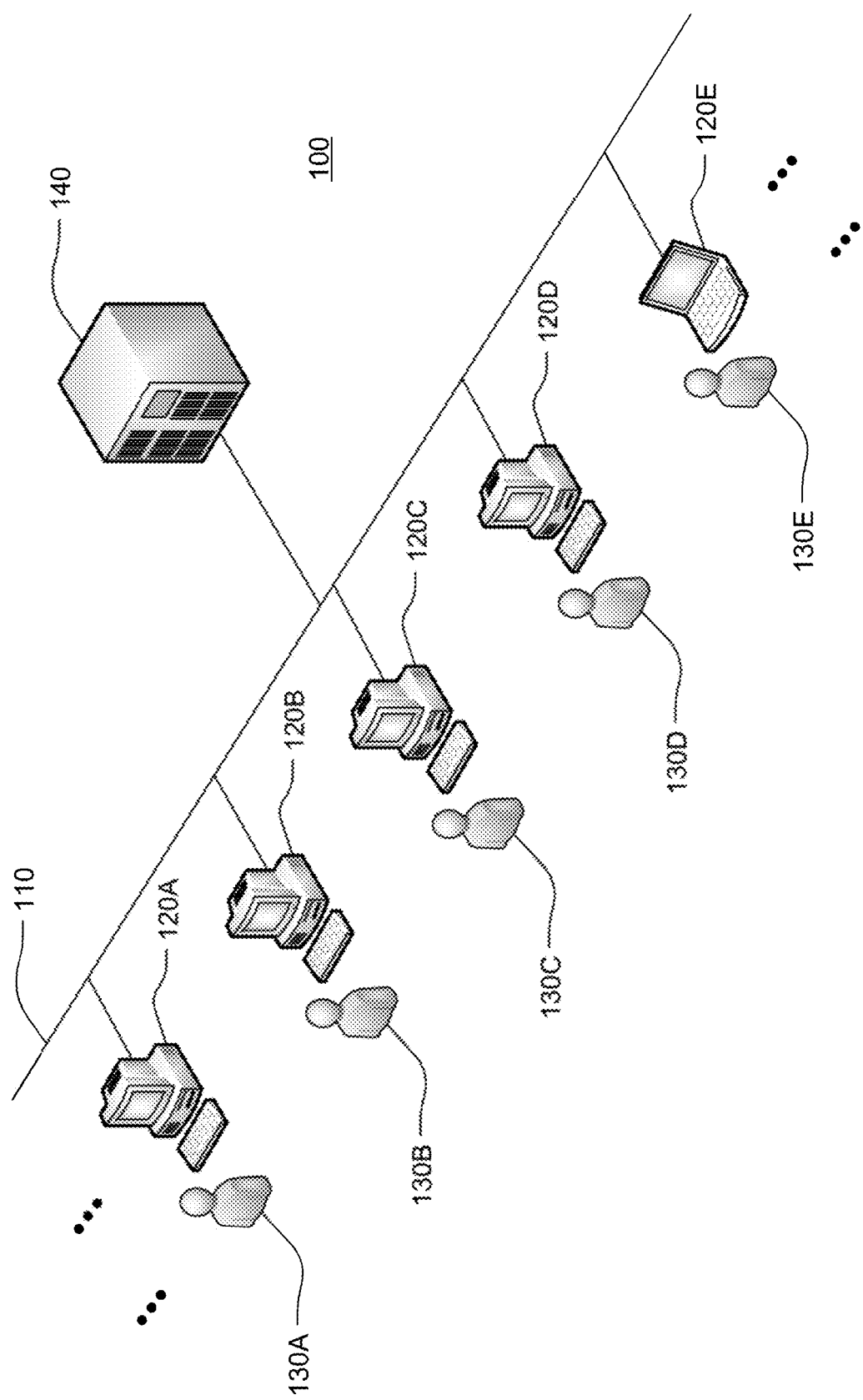
FIG. 1 illustrates an example IT system including a plurality of devices connected to each other via a communication network.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This application is directed to dynamically grouping a plurality of nodes to create one or more attribute level groups ("level groups" hereinafter) based on degrees or values of an attribute that the nodes exhibit. The nodes may be members or users that have been in a relationship with each other in the same organization, group, team or project or in different organizations, groups, teams or projects. An attribute may be a quality or feature regarded as a characteristic of one or more nodes. For example, an attribute may be collaborativeness of one or more nodes with respect to other nodes, completeness of a task (e.g., a project, training, etc.) performed by one or more nodes, flexibility of a schedule by one or more nodes, or proficiency of a tool, application or language by one or more nodes. A level group may include a number of the nodes having the same or similar degrees or values of the same attribute. The nodes of the different level groups may have different attribute degrees or values.

The level groups may be created based on activities or status of the nodes. For example, the level groups may correspond to collaboration level groups created based on various collaboration activities among the nodes. The relationship between the nodes may be omni-directional or bidirectional from which an attribute may be detected and measured. An attribute metric may indicate a measured degree or value of an attribute of one or more nodes, for example, a length of time (e.g., 28 minutes 30 seconds), frequency (e.g., 5 times per month), number or percentage of an attribute, for example, collaborativeness, completeness, flexibility or proficiency.

The level groups may be sequentially created based on the attribute metric of the nodes. Before creating the level groups, a pool of the nodes may be generated and the nodes may be ranked based on the attribute metric. Then, the nodes may be dynamically grouped to sequentially create one or more level groups. Each level group may include one or more of the nodes selected according to a predetermined requirement including, for example, the rankings of the nodes and a level group condition. By dynamically creating the level groups, the nodes may be prioritized and evenly distributed over the level groups.

The dynamic grouping of the nodes may allow the level groups to be displayed on a display device in a visually differentiated manner reflecting the relative attribute metric of the nodes of each level group. For example, the level groups may be prioritized based on the attribute metric of the nodes included therein and arranged on an attribute map in the prioritized order. Each level group may be created to include at least one node but not more than a predetermined maximum number. The nodes having an insignificant attribute metric may be excluded from selection for creating the level groups. Also, maximum numbers of the nodes and level groups displayable on the display may be enforced. These may allow to selectively display the nodes in an organized manner without cluttering the display with too much information or displaying information too sparsely. As such, the nodes may be displayed, via a display, in a more user-friendly and aesthetically pleasing manner such that it may require a less cognitive load to understand and analyze attribute status and/or developments among the nodes.

FIG. 1 illustrates an example IT system 100, upon which aspects of this disclosure may be implemented. The IT system 100 may be implemented in a single site or spread out in a number of buildings or geographically separated locations. The IT system 100 may include a plurality of devices, including a first device 120A, second device 120B, third device 120C, fourth device 120D and fifth device 120E (collectively "devices 120"). Only five devices 120 are shown in FIG. 1, but the actual number of the devices 120 may vary depending on the size and type of an organization implementing the IT system 100. For example, the IT system 100 for a large IT company may include more than a thousand or tens of thousands of devices 120, which may be spread out among different geographical locations. The devices 120 may be any stationary or mobile computing or communications devices with networking capabilities. For example, the devices 120 may be a desktop computer, laptop computer, workstation, smartphone, tablet, telephone, etc. The devices 120 may be in communication with each other via a communication network 110. The network 110 may be a wired or wireless network or a combination of wired and wireless networks.

The devices 120A, 120B, 120C, 120D and 120E may be associated with a first user 130A, second user 130B, third user 130C, fourth user 130D and fifth user 130E (collectively "users 130"), respectively. More than one device may be associated with a user 130. For example, the fourth user 130D may be associated with a desktop computer, laptop computer, telephone, smartphone, tablet, conferencing device, presentation device, etc. The association between the devices 120 and users 130 may be changed if necessary. For example, when the second device 120B is not being used by the second user 130B, the first user 130A may log in to the second device 120B to access a cloud data storage, create or edit documents, send emails, etc. Once the first user 130A logs in to the second device 120B, the second device 120B may become associated with the first user 130A until the first user 130A logs out from the second device 120B. The users 130 may be members of the same organization, group, team or project or in different organizations, groups, teams and projects. The devices 120 may be used by the users 130 to perform one or more activities, for example, exchanging emails or messages, having phone conversations or chats, attending video conferences, etc. These activities may be related to an attribute, for example, collaboration with other users 130.

The IT system 100 may include a server 140, which may be in communication with the devices 120 via the communication network 140. The server 140 may be configured to track activities among the users 130 and generate attribute data from the tracked activities. For example, the server 140 may track communications (e.g., emails, messages, phones calls, chats, etc.) and meetings (e.g., in-person meetings, teleconferences, videoconferences, etc.) among the users 130 to generate collaboration data, which may include, for example, logs of the emails, messages, phone calls, chats, meetings and conferences. The email and message logs may include the identities of senders and receivers and dates and times associated with the emails and messages. The phone call and chat logs may include the identities associated with the callers and call recipients and dates, times and lengths of the phone calls and chats. The meeting and conference logs may include information regarding the participants in the meeting, and dates, times and lengths associated with the meetings and conferences. The collaboration data may be stored in one or more internal and/or external data storage of the server 140.

Based on the collaboration data, the server 140 may generate a collaboration metric of the users 130. The collaboration metric may be a collection of quantized values of the collaborative activities among the users 130 via the devices 120. In an aspect, the collaboration metric may include accumulated collaboration times among the users 130. For example, assuming that the first and fifth users 130A, 130E has talked over the phone six times for total 73 minutes and participated in the same meeting that lasted for 45 minutes for the last 7 days, the accumulated collaboration time between the first and fifth users 130A, 130E may be 118 minutes for the last 7 days.

The collaboration time may also include time associated with emails and messages exchanged between the users 130. For example, times that it takes to write and read an email may be determined arbitrarily or based on the average times (e.g., 5 minutes for writing an email, and 2 minutes for reading a received email). These times may be added to the collaboration time between the users 130.

In keeping with the previous example, when the first user 130A sends an email to the fifth user 130E, 5 minutes may be added to the collaboration time of the first user 130A with respect to the fifth user 130E, and 2 minutes may be added to the collaboration time of the fifth user 130E with respect to the first user 130A. As such, the collaboration metric may include the accumulated collaboration time of an individual user with respect to each of other users.

The server 140 may regard each user as a collaboration node. For example, the first, second, third, fourth and fifth users 130A, 130B, 130C, 130D and 130E may be regarded as first, second, third, fourth and fifth collaboration nodes, respectively. When one or more devices are associated with a user, the associated devices may also be regarded as the same collaboration node. Hence, a user, device and collaboration node may be interchangeably used. A user may perform various collaborative activities (e.g., emails, messages, phone calls, chats, video conferencing, etc.) using the one or more devices associated with the user. The server 140 may track the collaborative activities of a particular collaboration node based on the collaboration activities performed via the one or more devices associated with the particular user.

When requested, the server 140 may provide the collaboration metric to the device associated with the collaboration node. In doing so, the server 140 may send a portion of the collaboration metric that is relevant to the node. For example, when the third user 130C requests the collaboration metric, the server 140 may send the collaboration metric representing the collaborative activities involving the third user 130C with the remaining users 130. Alternatively, instead of sending the collaboration metric, the server 140 may provide the collaboration data to the third user 130C at the device 120C. The device 120C may then process the collaboration data to generate the collaboration metric.

Some of the devices 120 may be configured to process the collaboration metric received from the server 140 to generate a collaboration map, which may be displayed on a display screen of the devices 120. The collaboration map may be generated to show collaboration status and/or developments of a collaboration node with respect to other nodes. For example, the second device 120B may receive, from the server 140, the collaboration metric of the second user 130B with respect to other users, for example, the users 130A, 130C, 130D and 130E. The second device 120B may then process the received collaboration metric to dynamically group the nodes for creating one or more collaboration level groups based on predetermined rules and conditions. This may help reduce and/or avoid excessive information being cluttered on the collaboration map or information being sparsely provided on the collaboration map with too much gaps between the nodes, which may otherwise occur due to a lack of any rules, orders or priorities in grouping the nodes.

FIG. 2 is a flowchart for an example process 200 for processing an attribute metric of the users 130, which may be used to create an attribute map. The process 200 may be performed by any one or more of the devices 120 or server 140 that are individually or collectively capable of processing the attribute metric and generating an attribute map. In the process 200 shown in FIG. 2, collaboration among the users 130 is used as an example of the attribute. Hence, the node, attribute metric, level group and attribute map are hereinafter referred to as a collaboration node, collaboration metric, collaboration level group, collaboration map, respectively.

At step 210, a first collaboration node (e.g., node 120A) may receive a collaboration metric of the first collaboration node with respect to a plurality of second collaboration nodes (e.g., nodes 120B-120E) in communication with the first collaboration node via the communication network 110. The collaboration metric may be a collection of quantized values of the collaborative activities of the first collaboration node with respect to the second collaboration nodes. The server 140 may generate the collaboration metric by processing the collaboration data, and the first collaboration node may receive the collaboration metric from the server 140. Alternatively, the server 140 may provide the collaboration data to the first collaboration node, and the first collaboration node may process the collaboration data to generate the collaboration metric.

FIG. 4 illustrates an example collaboration metric 400 of the first collaboration node with respect to thirty second collaboration nodes N1 to N30 in a table format. In the table, "CN" (N=1 to 30) indicates a collaboration metric value (e.g., collaboration time) of the first collaboration node with respect to the Nth second collaboration node; "EN" (N=1 to 30) indicates an accumulated time for the emails and messages exchanged between the first collaboration node and the Nth second collaboration node; "PN" (N=1 to 30) indicates an accumulated time of the phone calls and chats between the first collaboration node and the Nth second collaboration node; and "MN" (N=1 to 30) indicates an accumulated time of the meetings and conferences involving the first collaboration node and the Nth second collaboration node.

In an aspect, the collaboration metric value CN may be a sum of various accumulated collaboration times for communications and meetings. For example, a collaboration metric value C1 may be a sum of the accumulated times E1, P1 and M1. Only collaboration node IDs (e.g., N1 to N30) and the collaboration metric values (e.g., C1 to C30) associated with the node IDs may be provided to the first collaboration node.

At step 220, the first collaboration node may generate, based on the received collaboration metric, a pool of the second collaboration nodes that have been in collaboration with the first collaboration node. The pool of the second collaboration nodes may include nodes that have been in collaboration with the first collaboration node more than a threshold level. The second collaboration nodes that have not been in collaboration with the first collaboration node or have been in collaboration with the first collaboration node less than the threshold level may be discarded. An example pool 500A is shown in FIG. 5A, in which the second collaboration nodes N1 to N25 that are determined to have been in collaboration with the first collaboration node based on the collaboration metric values C1 to C25.

At step 230, the first collaboration node may rank the second collaboration nodes in the generated pool 500A based on the collaboration metric values C1 to C25. The ranking may be determined solely based on each second collaboration node's collaboration metric such that the greater the collaboration metric value is, the higher a collaboration node is ranked. Alternatively, certain conditions may be factored in ranking the second collaboration nodes. For example, a second collaboration node's frequency of the communications and meetings with the first collaboration node may indicate a degree of the collaborative relationship with the first collaboration node. Hence, when there are two or more second collaboration nodes having the collaboration metric values, the one with a higher frequency of the communications and meetings with the first collaboration node may be ranked higher.

FIG. 5B illustrates the ranked pool 500B of the second collaboration nodes N1 to N25. Here, the second collaboration nodes N1 to N25 are ranked from a highest ranking X1 to a lowest ranking X25 based on the collaboration metric values C1 to C25 and rearranged in an order in which the second collaboration nodes are ranked. For example, the node N12 having the highest collaboration metric C12 may be ranked as the first (X1), the node N20 having the second highest collaboration metric C20 may be ranked as the second (X2), the node N16 having the third highest collaboration metric C16 may be ranked the third (X3) in the ranked pool 500B. The ranking may be continued until the node N21 having the lowest collaboration metric C21 is ranked as the twenty fifth in the ranked pool 500B.

At step 240, the first collaboration node may dynamically group the second collaboration nodes in the ranked pool 500B to sequentially create one or more collaboration level groups. Each collaboration level group may be created to include one or more of the second collaboration nodes selected according to a predetermined requirement. The predetermined requirements may include rankings of the seconds collaboration nodes and a collaboration level group condition. The collaboration level group condition may include a selection number requirement and a selection adjustment condition. The selection number requirement may include minimum and maximum numbers of the second collaboration nodes permitted in each collaboration level group. The maximum number may be selected to avoid too may second collaboration nodes showing up as the same collaboration level group in the collaboration map, which may clutter the collaboration map with too much information at a particular level. For example, the maximum number may be set to five. The minimum number may be set to one such that each collaboration level group may include at least one second collaboration node. This may avoid the second collaboration nodes being displayed too sparsely on the collaboration map.

The selection adjustment condition may be set to identify a situation where there is no meaningful difference in the collaboration metric between one or more second collaboration nodes tentatively selected for a specific collaboration level group and the second collaboration nodes that are not selected that specific collaboration level group. For example, the selection adjustment condition may include a condition that the collaboration metric value of one or more second collaboration nodes tentatively selected for the collaboration level group is not greater than the collaboration metric value of the second collaboration node that is not tentatively selected. An example of this situation is described with reference to FIGS. 6A and 6B. When the selection adjustment condition is met, the first collaboration node may adjust the selection of the second collaboration nodes for the collaboration level group such that each collaboration level group may be meaningfully differentiated from other collaboration level group. A more detailed process for dynamically grouping the second collaboration nodes is described below.

Figure 10:
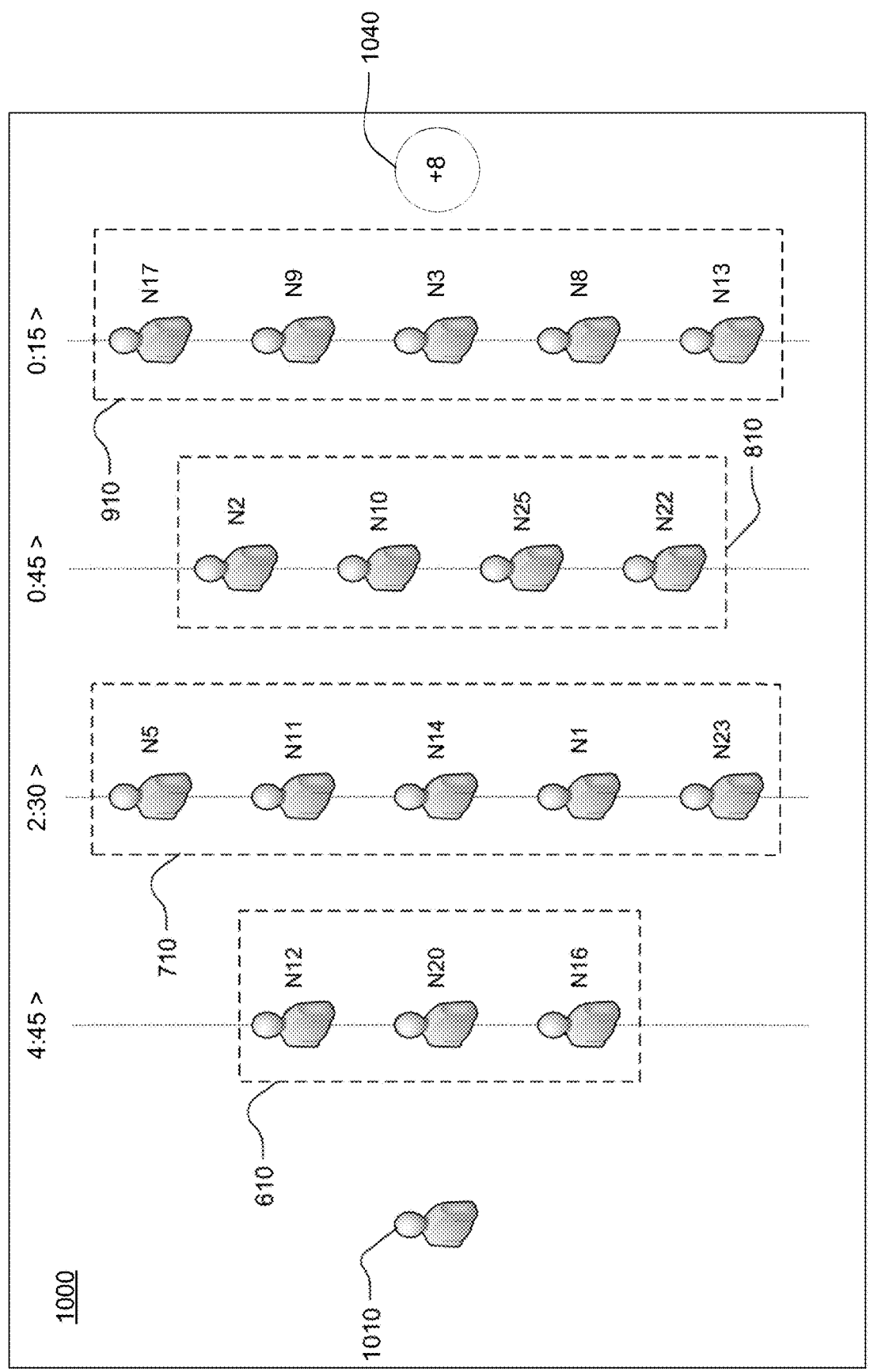
FIG. 10 illustrates an example collaboration map displayed on a display, in which the first, second, third and fourth collaboration level groups are arranged in a visually differentiated manner.

At step 250, the first collaboration node may display, on a display screen, the collaboration level groups in a visually differentiated manner reflecting a relative collaboration metric of each collaboration level group. For example, the first collaboration node may prioritize the collaboration level groups based on the collaboration metric. The first collaboration node may then position, on the collaboration, the collaboration level groups in an order in which the collaboration level groups are prioritized. For example, as shown in FIG. 10, the collaboration level groups may be arranged such that the greater the collaboration metric of a collaboration level group is, the closer a position of the collaboration level group becomes to the first collaboration node.

Figure 3:
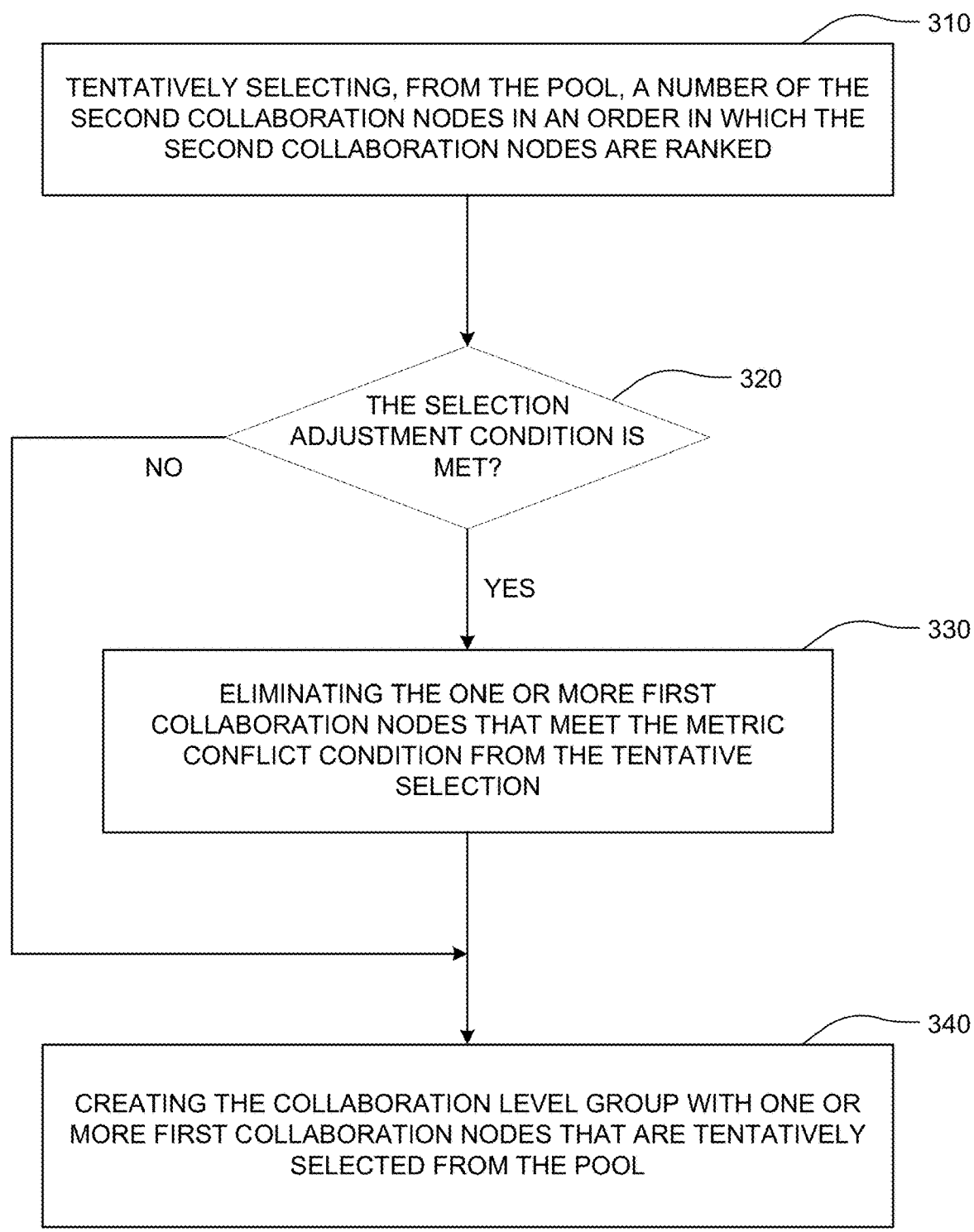
FIG. 3 is a flowchart for an example process for dynamically grouping a plurality of collaboration nodes to create one or more collaboration level groups.

FIG. 3 is a flowchart for an example process 300 for dynamically grouping a plurality of second collaboration nodes to sequentially create one or more collaboration level groups. At step 310, the first collaboration node may tentatively select, from the ranked pool 500B shown in FIG. 5B, a number of the second collaboration nodes in an order in which the second collaboration nodes are ranked. The number of the second collaboration nodes may be selected according to the selection number requirement, which may be the maximum number (e.g., five) of the second collaboration nodes permitted in a single collaboration level group. For example, as shown in FIG. 6A, the first collaboration node may tentatively select, from the ranked pool 500B, five highest ranked (e.g., X1 to X5) second collaboration nodes N12, N20, N16, N5 and N11 in the ranked order.

At step 320, the first collaboration node may determine whether the selection adjustment condition is met. The selection adjustment condition may include a metric conflict condition indicating that the collaboration metric of one or more second collaboration nodes tentatively selected from the ranked pool 500B is not greater than the collaboration metric of the second collaboration node that is not selected from the ranked pool 500B. If the selection adjustment condition is not met (No, at Step 320), the first collaboration node may determine that the tentatively selected first collaboration nodes are meaningfully distinguishable from the unselected second collaboration nodes in terms of the collaboration metric, and proceed to creating the collaboration level group with one or more first collaboration nodes that are tentatively selected from the pool 500B (Step 340).

When the selection adjustment condition is not met (No, at step 320), the first collaboration node may eliminate one by one the one or more second collaboration nodes that meet a metric conflict condition from the tentative selection. The metric conflict condition may include a condition that the collaboration metric of one or more second collaboration nodes tentatively selected from the pool is not greater than the collaboration metric of the second collaboration node that is not tentatively selected from the pool.

Figures 6A, 6B, 6C:
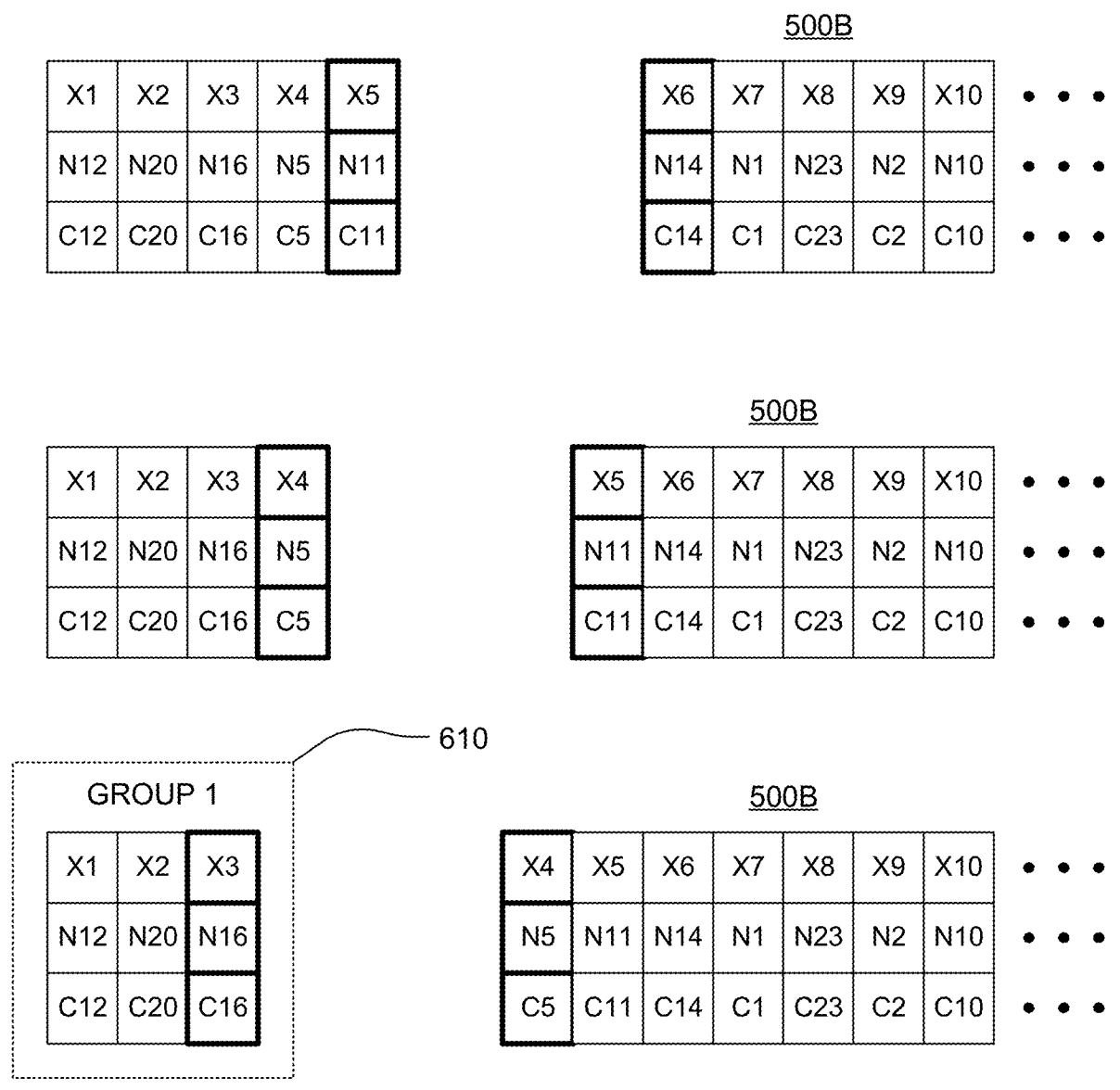

For example, as shown in FIG. 6A, the first collaboration node may compare the collaboration metric values of the second collaboration node N11, which is the lowest ranked collaboration node tentatively selected from the ranked pool 500B, and the second collaboration node N14, which is the highest ranked collaboration node that is not selected from the ranked pool 500B. When the collaboration metric value of the node 11 is not greater than the collaboration metric value of the node 14, the node 11 may meet the metric conflict condition and may be eliminated from the tentative selection. Such elimination makes the node N5 the lowest ranked node within the tentatively selected second collaboration nodes. Then, as shown in FIG. 6B, the node 5 is selected to be compared with the node 11 to see if the node 5 meets the metric conflict condition. Upon determining that the node N5 meets the metric conflict condition, the node N5 may be eliminated from the tentative selection. Subsequently, as shown in FIG. 6C, the node N16, which became the lowest ranked among the tentatively selected second collaboration node, may be compared to the node N5 to determine if the node N16 meets the metric conflict condition. If the metric condition is not met by the node N16, the process 300 may move to the step 340 such that the first collaboration node may create the first collaboration level group 610 with the second collaboration nodes N12, N20 and N16.

Figure 7:
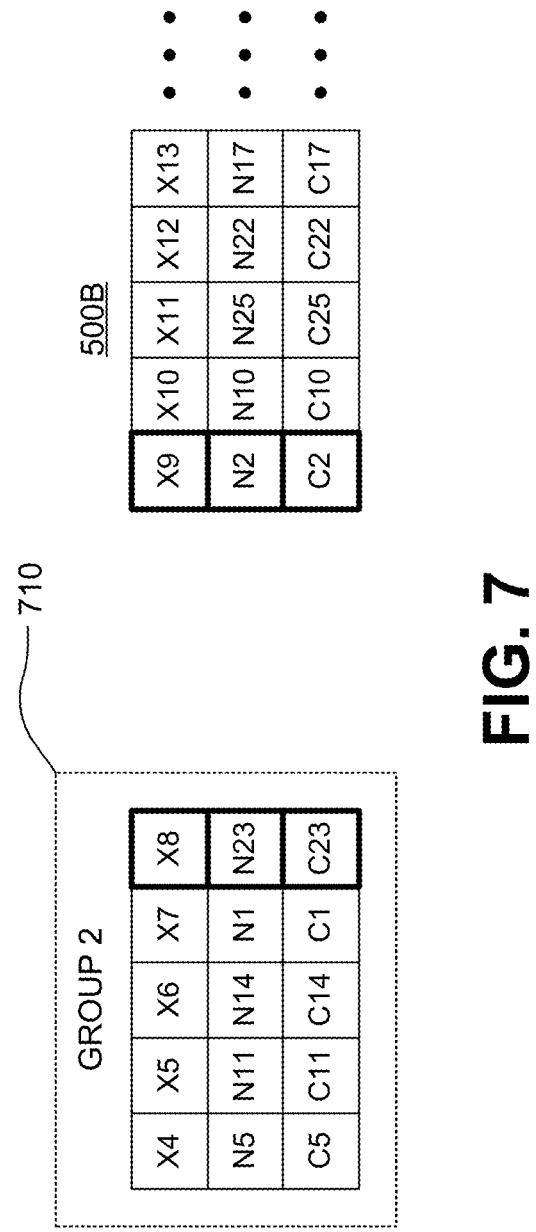
FIG. 7 illustrates an example of dynamically creating a second collaboration level group with the second collaboration nodes selected from the pool.
Figures 8A, 8B:
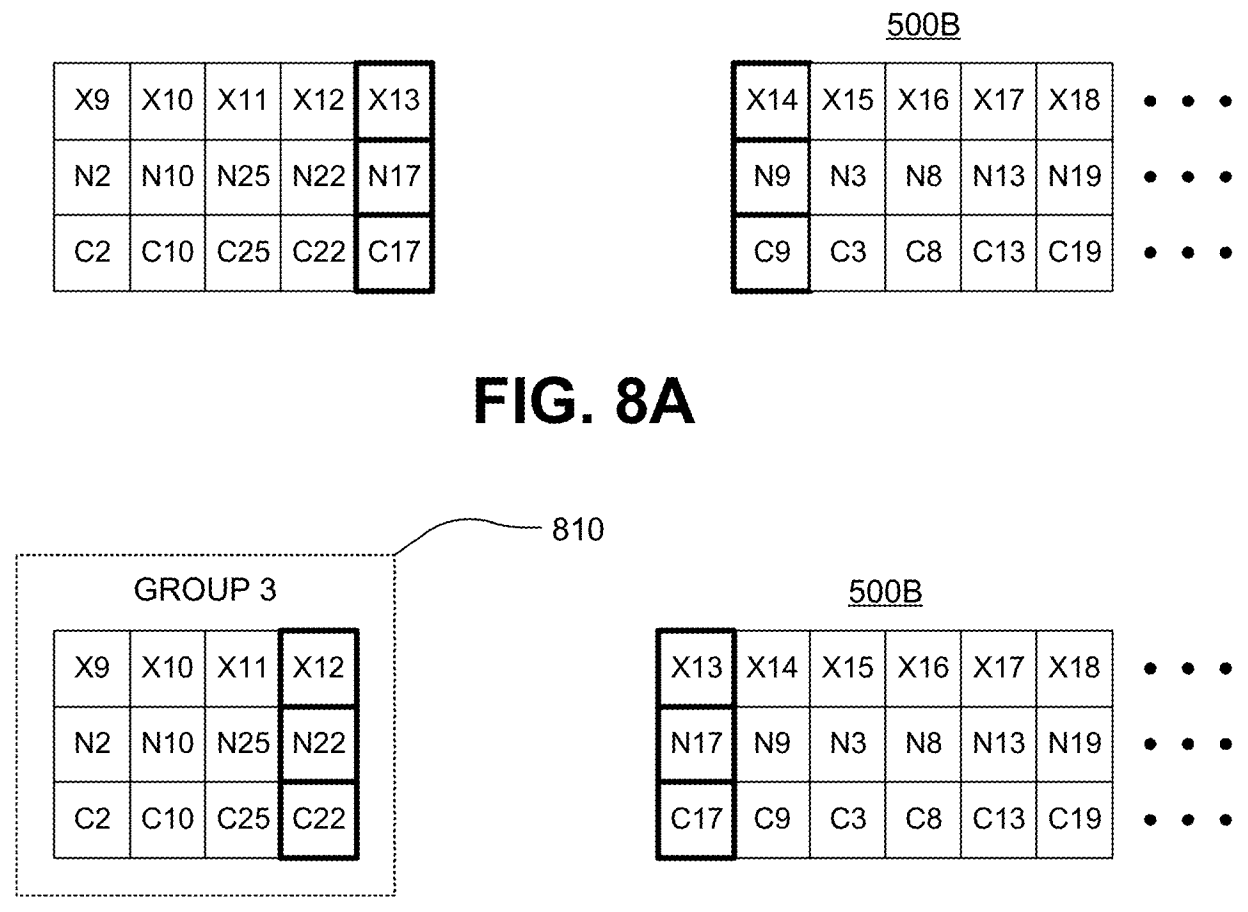
Figure 9:
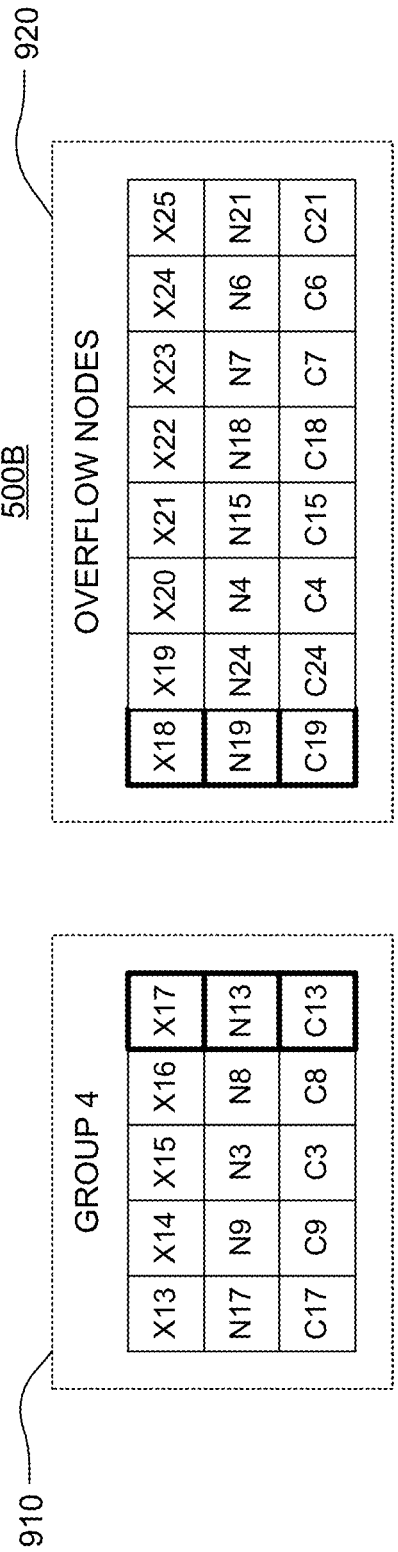
FIG. 9 illustrates an example of dynamically creating a fourth collaboration level group with the collaboration nodes selected from the pool.

Upon creating the first collaboration level group 610, a next collaboration level group may be created after the second collaboration nodes N12, N20 and N16 selected for the first collaboration level group 610 are eliminated from the ranked pool 500B. First, the first collaboration node may determine whether a number of the created collaborated level groups meets a group number limit (e.g., four). If the group number limit is not met, the first collaboration node may remove, from the ranked pool 500B, the one or more second collaboration nodes included in the created collaboration level group. For example, the second collaboration nodes N12, N20 and N16 that are selected for the first collaboration level group 610 may be removed from the ranked pool 500B. Then, the first collaboration node may repeat the selecting at step 310, determining at step 320, eliminating at step 330 and creating at step 340 until the group number limit is met. For example, as shown in FIG. 7, the second collaboration level group 710 may be created with five second collaboration nodes N5, N11, N14, N1 and N23 after comparing the collaboration metric values of the collaboration nodes N23 and N2. As shown in FIGS. 8A and 8B, the third collaboration level group 810 may be created with four second collaboration nodes N2, N10, N25 and N22 after the second collaboration node N17 is eliminated for meeting the metric conflict condition. As shown in FIG. 9, the fourth collaboration level group 910 may be created with five second collaboration nodes N17, N9, N3, N8 and N13. Once the fourth collaboration level group 910 is created, the group number limit (e.g., four) may be met, and the first collaboration node may no longer attempt to create an additional collaboration level group. The remaining eight second collaboration nodes N19, N24, N4, N15, N18, N7, N6 and N21 may be regarded as overflow nodes 920.

The first collaboration node may display, on a display screen (e.g., computer monitor or mobile device), the first, second, third and fourth collaboration level groups 610, 710, 810 and 910 in a visually differentiated manner reflecting a relative collaboration metric of each collaboration group.

FIG. 10 illustrates an example collaboration map 1000 displayed on a display device. The map 100 includes the first collaboration node 1010 and a plurality of collaboration level groups 610, 710, 810, 910. Each collaboration level group may include at least one second collaboration node but not more than five according to the selection number requirement in one specific example.

On the collaboration map 1000, a relative position or proximity of each collaboration level group to the first collaboration node 1010 may be determined based on the collaboration metric values of the second collaboration nodes included in each collaboration level group. For example, the collaboration level group 610 including the highest ranked second collaboration nodes N12, N20 and N16 may be positioned closest to the first collaboration node 1010. The collaboration group 910 including the lowest ranked second collaboration nodes N17, N9, N3, N8 and N13 may be positioned furthest from the first collaboration node 1010. The collaboration level groups 610, 710, 810, 910 may be positioned side by side with a constant gap therebetween such that the second collaboration nodes are not arranged too sparsely. The second collaboration nodes having less than a predetermined collaboration metric value (e.g., less than 15 minutes) may be hidden and accessible via selection of an icon or button 1040. Once selected, the icon or button 1040 may show additional overflow nodes (e.g., +8). This may help avoid collaboration map 1000 clutter with unnecessary or less valuable information.

In addition, the first collaboration node may be configured to display the collaboration level groups according to a display requirement, which may include a maximum number of the second collaboration nodes displayable on the display, and a maximum number of the collaboration level groups displayable on the display. The maximum numbers of the second collaboration nodes and the collaboration level group displayable on the display device may be determined to avoid cluttering or sparseness of the second collaboration nodes displayed on the display device. For example, the collaboration map 100 may be created such that 4 or fewer collaboration level groups and 25 or fewer second collaboration nodes may be shown on the collaboration map 1000. As such, the second collaboration nodes may be displayed in a more user-friendly and aesthetically pleasing manner such that it may require a less cognitive load to understand and analyze collaboration status and/or developments among the collaboration nodes.

Figure 11:
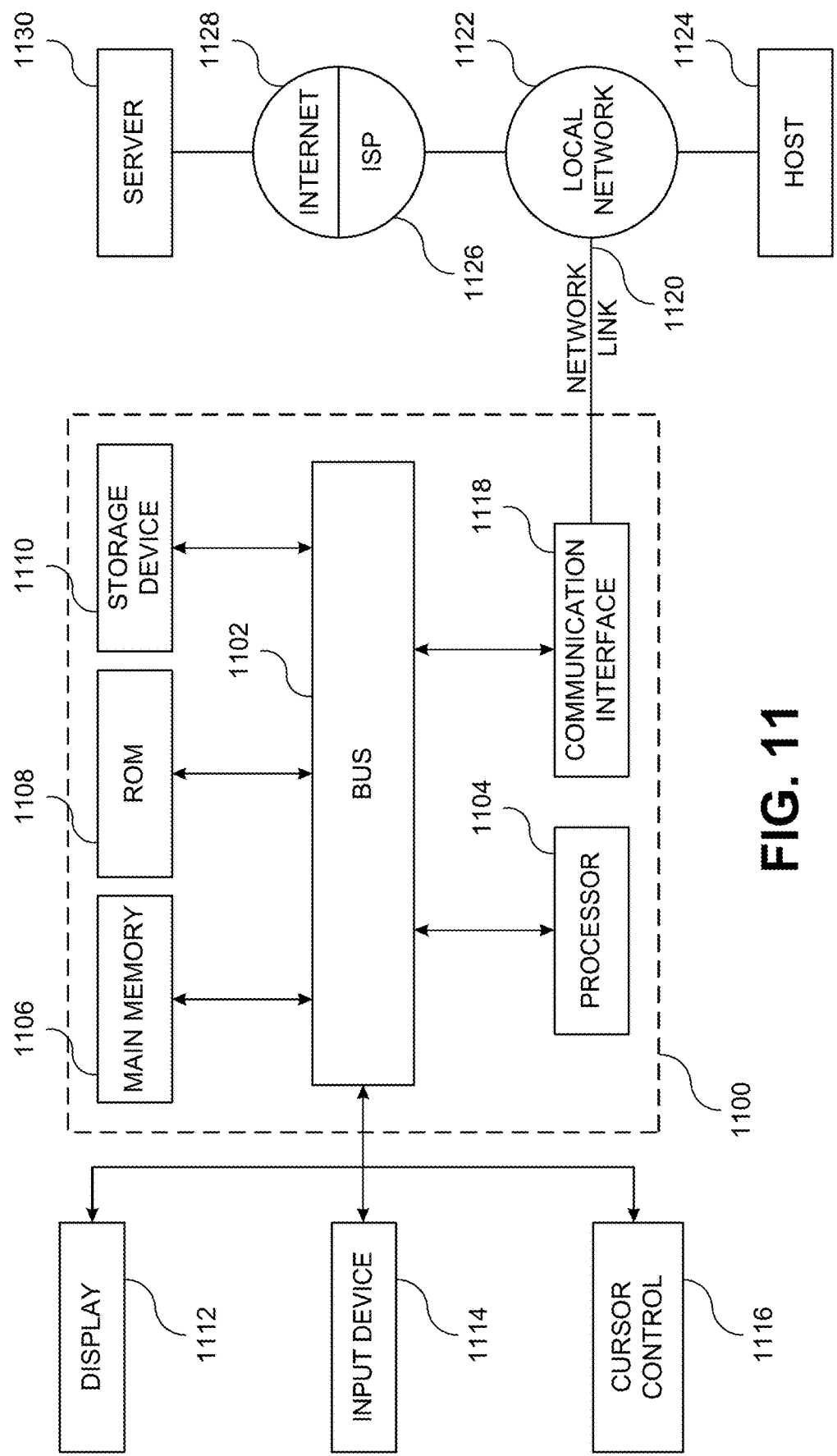
FIG. 11 is a block diagram showing an example computer system upon which aspects of this disclosure may be implemented.

FIG. 11 is a block diagram showing an example computer system 1100 upon which aspects of this disclosure may be implemented. The computer system 1100 may include a bus 1102 or other communication mechanism for communicating information, and a processor 1104 coupled with the bus 1102 for processing information. The computer system 1100 may also include a main memory 1106, such as a random-access memory (RAM) or other dynamic storage device, coupled to the bus 1102 for storing information and instructions to be executed by the processor 1104. The main memory 1106 may also be used for storing temporary variables or other intermediate information during execution of instructions to be executed by the processor 1104. The computer system 1100 may implement, for example, the devices 120, server 140, first collaboration node and/or second collaboration nodes.

The computer system 1100 may further include a read only memory (ROM) 1108 or other static storage device coupled to the bus 1102 for storing static information and instructions for the processor 1104. A storage device 1110, such as a flash or other non-volatile memory may be coupled to the bus 1102 for storing information and instructions.

The computer system 1100 may be coupled via the bus 1102 to a display 1112, such as a liquid crystal display (LCD), for displaying information. One or more user input devices, such as the example user input device 1114 may be coupled to the bus 1102, and may be configured for receiving various user inputs, such as user command selections and communicating these to the processor 1104, or to the main memory 1106. The user input device 1114 may include physical structure, or virtual implementation, or both, providing user input modes or options, for controlling, for example, a cursor, visible to a user through display 1112 or through other techniques, and such modes or operations may include, for example virtual mouse, trackball, or cursor direction keys.

The computer system 1100 may include respective resources of the processor 1104 executing, in an overlapping or interleaved manner, respective program instructions. Instructions may be read into the main memory 1106 from another machine-readable medium, such as the storage device 1110. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1110. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1100 may also include a communication interface 1118 coupled to the bus 1102, for two-way data communication coupling to a network link 1120 connected to a local network 1122. The network link 1120 may provide data communication through one or more networks to other data devices. For example, the network link 1120 may provide a connection through the local network 1122 to a host computer 1124 or to data equipment operated by an Internet Service Provider (ISP) 1126 to access through the Internet 1128 a server 1130, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for displaying a plurality of level groups in a visually differentiated manner, comprising:
   a processor; and,
   a computer readable medium in communication with the processor, the computer readable medium comprising executable instructions that, when executed by the processor, cause the data processing system to perform functions of:
   receiving an attribute metric indicating a degree of activities between a first node and each of a plurality of second nodes in communication with the first node via a communication network;

generating, based on the received attribute metric, a pool of the second nodes that have been in a relationship with the first node;

ranking, based on the received attribute metric, the second nodes in the generated pool;

sequentially creating a plurality of level groups, each level group including one or more of the second nodes selected from the pool according to a predetermined requirement including the rankings of the second nodes and a level group condition, wherein each level group is created by:

tentatively selecting, from the pool, a number of the second nodes based on the ranking of the second nodes; and adjusting the tentative selection of the second nodes based on comparison between the attribute metrics of the tentatively selected second nodes and the attribute metrics of the second nodes remaining in the pool; and displaying, on a display, the level groups in a visually differentiated manner reflecting a relative attribute metric of each level group.

2. The data processing system of claim 1, wherein the attribute metric includes a collaboration time between the first node and each second node.

3. The data processing system of claim 2, wherein the collaboration time is determined based on at least one of:

a number of emails between the first node and each second node;

an accumulated length of phone calls between the first node and each second node; and an accumulated length of meetings involving the first node and each second node.

4. The data processing system of claim 1, wherein the level group condition includes a selection number requirement and a selection adjustment condition.

5. The data processing system of claim 4, wherein the selection number requirement includes minimum and maximum numbers of the second nodes permitted in each level group.

6. The data processing system of claim 4, wherein the selection adjustment condition includes a condition that the attribute metric of one or more second nodes selected for the level group is not greater than the attribute metric of the second node that is not selected for the level group.

7. The data processing system of claim 4, wherein:

for tentatively selecting, from the pool, the number of the second nodes, the instructions, when executed by the processor, further cause the data processing system to perform a function of tentatively selecting, from the pool, a number of the second nodes in an order in which the second nodes are ranked, wherein the number of the second nodes is selected according to the selection number requirement, and for adjusting the tentative selection of the second nodes, the instructions, when executed by the processor, further cause the processor to control the data processing system to perform functions of:

determining whether the selection adjustment condition is met, the selection adjustment condition includes a metric conflict condition that the attribute metric of one or more second nodes tentatively selected from the pool is not greater than the attribute metric of the second node that is not tentatively selected from the pool;

if the selection adjustment condition is met, eliminating the one or more second nodes that meet the metric conflict condition from the tentative selection; and creating the level group with one or more second nodes that are tentatively selected from the pool and do not meet the metric conflict condition.

8. The data processing system of claim 7, wherein the instructions, when executed by the processor, further cause the data processing system to perform functions of:

determining whether a number of the created level groups meets a group number limit; and in response to determining that the group number limit is not met, repeating tentatively selecting the number of the second nodes and adjusting the tentative selection of the second nodes.

9. The data processing system of claim 1, wherein the level groups are displayed on the display according to a display requirement including at least one of:

a maximum number of the second nodes displayable on the display; and a maximum number of the level groups displayable on the display.

10. The data processing system of claim 1, wherein relative positions of the one or more level groups displayed on the display are determined based on the relative attribute metric of the level groups.

11. A method of operating a data processing system for displaying a plurality of level groups in a visually differentiated manner, comprising:

receiving an attribute metric indicating a degree of activities between a first node and each of a plurality of second nodes in communication with the first node via a communication network;

generating, based on the received attribute metric, a pool of the second nodes that have been in a relationship with the first node;

ranking, based on the received attribute metric, the second nodes in the generated pool;

sequentially creating a plurality of level groups, each level group including one or more of the second nodes selected from the pool according to a predetermined requirement including the rankings of the second nodes and a level group condition, wherein each level group is created by:

tentatively selecting, from the pool, a number of the second nodes based on the ranking of the second nodes; and adjusting the tentative selection of the second nodes based on comparison between the attribute metrics of the tentatively selected second nodes and the attribute metrics of the second nodes remaining in the pool; and displaying, on a display, the level groups in a visually differentiated manner reflecting a relative attribute metric of each level group.

12. The method of claim 11, wherein the attribute metric includes a collaboration time between the first node and each second node.

13. The method of claim 12, wherein the collaboration time is determined based on at least one of:

a number of emails between the first node and each second node;

an accumulated length of phone calls between the first node and each second node; and an accumulated length of meetings involving the first node and each second node.

14. The method of claim 11, wherein the level group condition includes a selection number requirement and a selection adjustment condition.

15. The method of claim 14, wherein the selection number requirement includes minimum and maximum numbers of the second nodes permitted in each level group.

16. The method of claim 14, wherein the selection adjustment condition includes a condition that the attribute metric of one or more second nodes selected for the level group is not greater than the attribute metric of the second node that is not selected for the level group.

17. The method of claim 14, wherein:
tentatively selecting the number of the second nodes comprises tentatively selecting, from the pool, a number of the second nodes in an order in which the second nodes are ranked, wherein the number of the second nodes is selected according to the selection number requirement, and
adjusting the tentative selection of the second nodes comprises:
determining whether the selection adjustment condition is met, the selection adjustment condition includes a metric conflict condition that the attribute metric of one or more second nodes tentatively selected from the pool is not greater than the attribute metric of the second node that is not tentatively selected from the pool;
if the selection adjustment condition is met, eliminating the one or more second nodes that meet the metric conflict condition from the tentative selection; and
creating the level group with one or more second nodes that are tentatively selected from the pool and do not meet the metric conflict condition.

18. The method of claim 17, further comprising:
determining whether a number of the created level groups meets a group number limit; and
in response to determining that the group number limit is not met, repeating tentatively selecting the number of the second nodes and adjusting the tentative selection of the second nodes.

19. The method of claim 11, wherein the level groups are displayed on the display according to a display requirement including at least one of:
a maximum number of the second nodes displayable on the display; and
a maximum number of the level groups displayable on the display.

20. A non-transitory computer readable medium containing instructions which, when executed by a processor, cause the processor to control a system to perform:
receiving an attribute metric indicating a degree of activities between a first node and each of a plurality of second nodes in a relationship with the first node via a communication network;
generating, based on the received attribute metric, a pool of the second nodes that have been in a relationship with the first node;
ranking, based on the received attribute metric, the second nodes in the generated pool;
sequentially creating a plurality of level groups, each level group including one or more of the second nodes selected from the pool according to a predetermined requirement including the rankings of the second nodes and a level group condition, wherein each level group is created by:
tentatively selecting, from the pool, a number of the second nodes based on the ranking of the second nodes; and
adjusting the tentative selection of the second nodes based on comparison between the attribute metrics of the tentatively selected second nodes and the attribute metrics of the second nodes remaining in the pool; and
displaying the level groups in a visually differentiated manner reflecting a relative attribute metric of each level group.

* * * * *